(12) United States Patent
Chang et al.

(10) Patent No.: US 11,366,604 B1
(45) Date of Patent: Jun. 21, 2022

(54) METHOD OF OPERATING PHYSICALLY UNCLONABLE FUNCTION CIRCUIT, PHYSICALLY UNCLONABLE FUNCTION CIRCUIT AND SEMICONDUCTOR CHIP

(71) Applicant: UNITED MICROELECTRONICS CORP., Hsin-Chu (TW)

(72) Inventors: Ko-Chin Chang, Hsinchu (TW); Ming-Jen Chang, Kaohsiung (TW); Cheng-Hsiao Lai, Chiayi County (TW); Yu-Syuan Lin, New Taipei (TW); Chi-Fa Lien, Hsinchu (TW); Ying-Ting Lin, Hsinchu County (TW); Yung-Tsai Hsu, Hsinchu County (TW)

(73) Assignee: UNITED MICROELECTRONICS CORP., Hsin-Chu (TW)

( * ) Notice: Subject to any disclaimer, the term of this patent is extended or adjusted under 35 U.S.C. 154(b) by 0 days.

(21) Appl. No.: 17/210,545

(22) Filed: Mar. 24, 2021

(30) Foreign Application Priority Data

Feb. 19, 2021 (CN) .......................... 202110191569.0

(51) Int. Cl.
*G06F 3/06* (2006.01)
*G11C 16/10* (2006.01)
*G11C 16/16* (2006.01)
*G11C 16/28* (2006.01)
*G11C 16/22* (2006.01)

(52) U.S. Cl.
CPC .......... *G06F 3/0652* (2013.01); *G06F 3/0608* (2013.01); *G06F 3/0679* (2013.01); *G11C 16/10* (2013.01); *G11C 16/16* (2013.01); *G11C 16/22* (2013.01); *G11C 16/28* (2013.01)

(58) Field of Classification Search
CPC .... G06F 3/0652; G06F 3/0608; G06F 3/0679; G11C 16/10; G11C 16/16; G11C 16/22; G11C 16/28
USPC ........................................................ 711/154
See application file for complete search history.

(56) References Cited

U.S. PATENT DOCUMENTS

| 5,239,494 | A | * | 8/1993 | Golbeck | ............... | H04L 9/0662 |
| | | | | | | 708/3 |
| 5,961,577 | A | * | 10/1999 | Soenen | .................. | G06F 7/588 |
| | | | | | | 708/251 |
| 9,870,829 | B2 | | 1/2018 | Park | | |

FOREIGN PATENT DOCUMENTS

| CN | 1826659 | * | 8/2006 | ............. | G11C 11/56 |
| DE | 102019108053 A1 | * | 10/2019 | ............. | A01D 34/78 |

\* cited by examiner

*Primary Examiner* — Fernando Hidalgo
(74) *Attorney, Agent, or Firm* — Winston Hsu

(57) ABSTRACT

A physically unclonable function includes a flash memory, a current comparator and a controller. The flash memory includes a plurality of memory cells. A method of operating the physically unclonable function circuit includes the controller setting the plurality of memory cells to an initial data state, the controller setting the plurality of memory cells between the initial data state and an adjacent data state of the initial data state, the current comparator reading a first current from a memory cell in a first section of the plurality of the memory cells, the current comparator reading a second current from a memory cell in a second section of the plurality of the memory cells, and the current comparator outputting a random bit according to the first current and the second current.

20 Claims, 7 Drawing Sheets

METHOD OF OPERATING PHYSICALLY UNCLONABLE FUNCTION CIRCUIT, PHYSICALLY UNCLONABLE FUNCTION CIRCUIT AND SEMICONDUCTOR CHIP

CROSS REFERENCE TO RELATED APPLICATION

This non-provisional application claims priority of China patent application No. 202110191569.0, filed on 19 Feb. 2021, included herein by reference in its entirety.

BACKGROUND OF THE INVENTION

1. Field of the Invention

The invention relates to data security, and in particular, to an operating method of a physical unclonable function circuit, a physical unclonable function circuit and a semiconductor chip.

2. Description of the Prior Art

A physical unclonable function (PUF) circuit utilizes a unique "digital fingerprint" of each semiconductor device to prevent data theft and ensure data security. The PUF circuit in the related art sets memory cells to a marginal range near a read current level, and uses the read current level to read the memory cells to generate random data. However, when the read current level is not in the center of the marginal range, the randomness of random data will be reduced, resulting in reduced data security.

SUMMARY OF THE INVENTION

According to an embodiment of the invention, a method of operating a physically unclonable function (PUF) circuit is provided. The physical unclonable function circuit includes a flash memory, a current comparator and a controller. The flash memory includes a plurality of memory cells. The method includes the controller setting the plurality of memory cells to an initial data state, the controller setting the plurality of memory cells to a state between the initial data state and an adjacent data state of the initial data state, the current comparator reading a first current from a memory cell in a first section of the plurality of memory cells, the current comparator reading a second current from a memory cell in a second section of the plurality of memory cells, and the current comparator outputting a random bit according to the first current and the second current.

According to another embodiment of the invention, a physical unclonable function circuit includes a flash memory, a current comparator and a controller. The flash memory includes a plurality of memory cells. The current comparator is coupled to a memory cell in a first section of the plurality of memory cells and a memory cell in a second section of the plurality of memory cells. The controller is coupled to the flash memory and the current comparator. The controller is used to set the plurality of memory cells to an initial data state, and set the plurality of memory cells to a state between the initial data state and an adjacent data state of the initial data state. The current comparator is used to read the first current from the memory cell in the first section, read the second current from the memory cell in the second section, and output a random bit according to the first current and the second current.

According to another embodiment of the invention, a semiconductor chip includes a physical unclonable function circuit and a key generator. The physical unclonable function circuit includes a flash memory, a current comparator and a controller. The flash memory includes a plurality of memory cells. The current comparator is coupled to a memory cell in a first section of the plurality of memory cells and a memory cell in a second section of the plurality of memory cells. The controller is coupled to the flash memory and the current comparator. The key generator is coupled to the physical unclonable function circuit. The controller is used to set the plurality of memory cells to an initial data state, and set the plurality of memory cells to a state between the initial data state and an adjacent data state of the initial data state. The current comparator is used to read the first current from the memory cell in the first section, read the second current from the memory cell in the second section, and output a random bit according to the first current and the second current. The key generator is configured to generate a key according to the random bit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
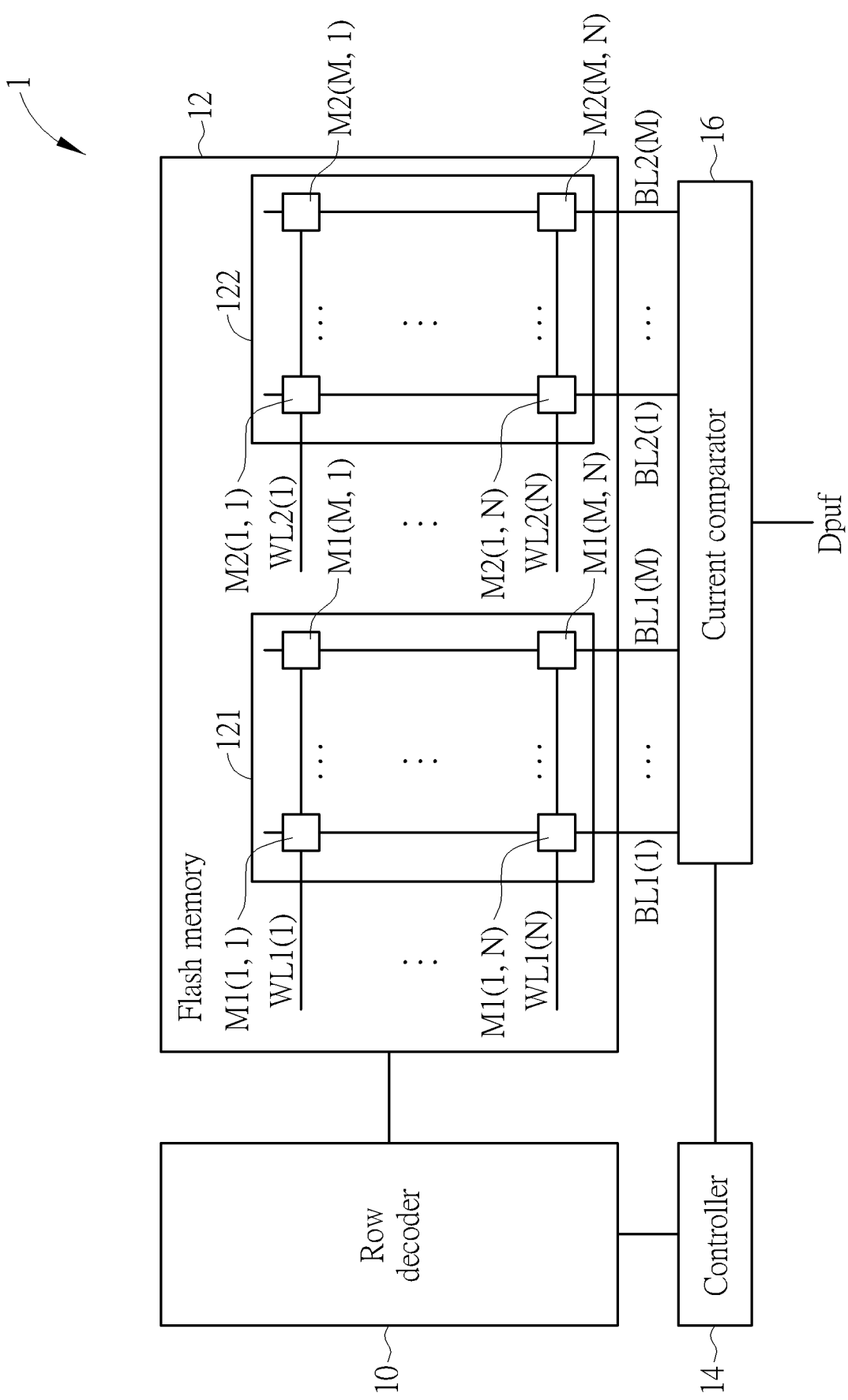
FIG. 1 is a block diagram of a physical unclonable function circuit according to an embodiment of the invention.

FIG. 1 is a block diagram of a physical unclonable function (PUF) circuit according to an embodiment of the invention. The PUF circuit 1 may generate a random bit Dpuf without using a read current level, thereby increasing the randomness of the random bit Dpuf. The random bit Dpuf may have a first logical value or a second logical value, and the probability of the random bit Dpuf being the first logical value and the probability of the random bit Dpuf being the second logical value may be substantially equal. The first logical value may be, but is not limited to, a logic "0", and the second logical value may be, but is not limited to, a logic "1".

The PUF circuit 1 may include a row decoder 10, a flash memory 12, a controller 14 and a current comparator 16. The flash memory 12 may be a NAND flash memory, and may include memory blocks 121 and 122. The memory block 121 may include memory cells M1(1,1) to M1(M,N) arranged in N rows, and the N rows of memory cells in the memory block 121 may be coupled to the row decoder 10 via the word lines WL1(1) to WL1(N) and may be coupled to the current comparator 16 via the bit lines BL1(1) to BL1(M), M, N being positive integers larger than 1. The memory block 122 may include memory cells M2(1,1) to M2(M,N) arranged in N rows, and the N rows of memory cells in the memory block 122 may be coupled to the row decoder 10 via the word lines WL2(1) to WL2(N) and may be coupled to the current comparator 16 via the bit lines BL2(1) to BL2(M). The memory cells M1(1,1) to M1(M,N) and M2(1,1) to M2(M,N) may be single-level cells or multi-level cells. The current comparator 16 may be a sense amplifier or a differential current comparator. The controller 14 may be coupled to the current comparator 16, and coupled to the flash memory 12 via the row decoder 10.

Figure 2:
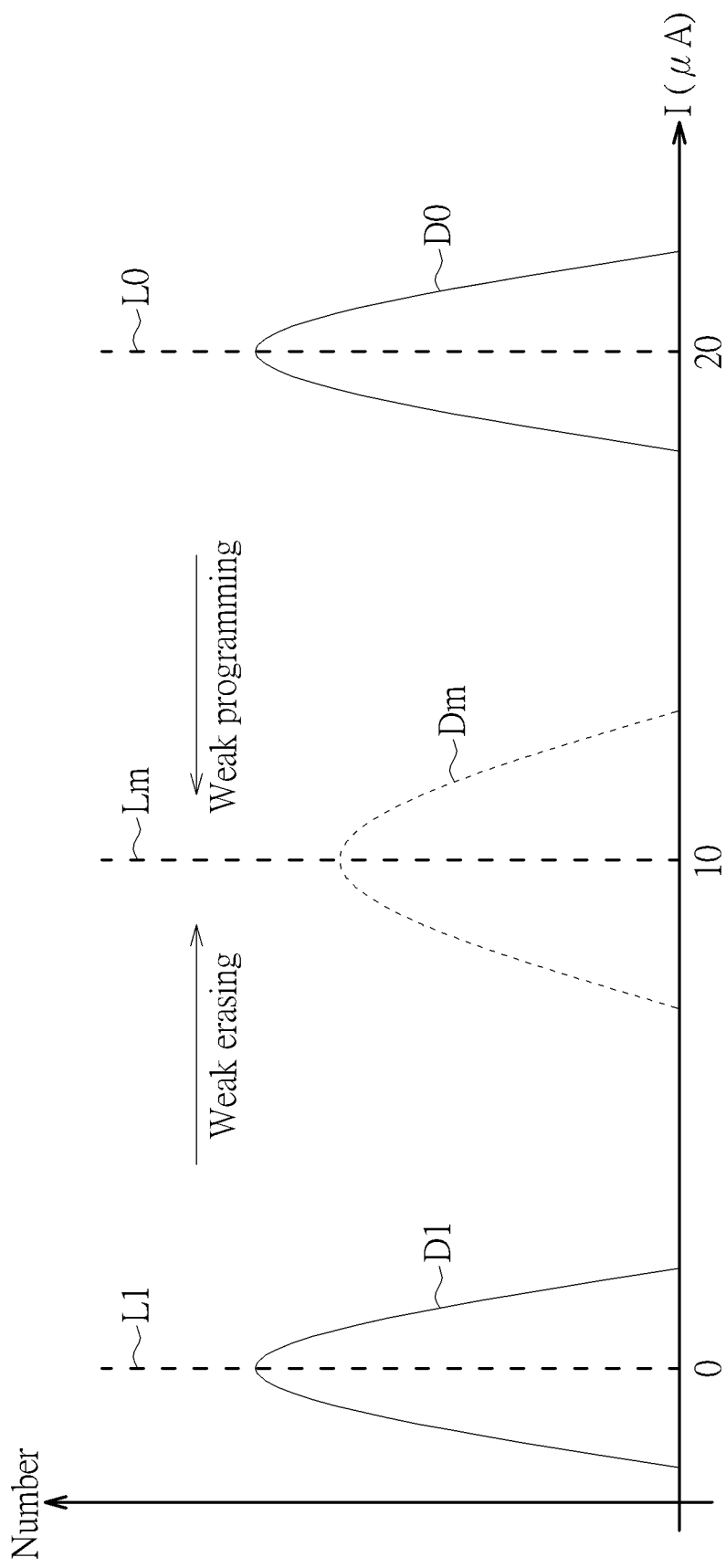
FIG. 2 shows a current distribution of the memory cells in FIG. 1.

The memory cells M1(1,1) to M1(M,N), M2(1,1) to M2(M,N) may be set to an erased state, a programming state or a metastable state. The metastable state may be located between the erased state and the programming state. In a normal operation, each memory cell M1(1,1) to M1(M,N), M2(1,1) to M2(M,N) may be set to the erased state or the programming state, but not to the metastable state. When generating the random bit Dpuf, the memory cells M1(1,1) to M1(M,N) and M2(1,1) to M2(M,N) are set to the metastable state. The controller 14 may set the memory cells M1(1, 1) to M1 (M, N) and M2 (1, 1) to M2 (M, N) to the metastable state during a factory test or a reset mode. FIG. 2 shows the current distributions of memory cells M1(1,1) to M1(M,N), M2(1,1) to M2(M,N), where the horizontal axis represents the current and the vertical axis represents the number of memory cells. When reading data, the controller 14 may apply a predetermined read voltage via the row decoder 10, for example, 0V to the control terminals of the memory cells M1(1,1) to M1(M,N), M2(1,1) to M2(M,N), the current comparator 16 may read currents flowing through the memory cells M1(1,1) to M1(M,N), M2(1,1) to M2(M,N) to determine the states thereof. According to the states of the memory cells M1(1,1) to M1(M,N), and M2(1,1) to M2(M,N), the read currents I may form distributions D1, Dm or D0. The distributions D1, Dm, and D0 represent current distributions of the memory cells M1(1,1) to M1(M,N), M2(1,1) to M2(M,N) in the programming state, the metastable state and the erased state, respectively. Current levels L1, Lm, and L0 are the averages of the distributions D1, Dm, and D0, respectively. For example, the current levels L1, Lm, and L0 may be 0 µA, 10 µA, and 20 µA, respectively. When setting the metastable state, the controller 14 may first erase the data in the memory cells M1(1,1) to M1(M,N), M2(1,1) to M2(M,N) (Distribution D0), and then program the memory cells M1(1,1) to M1(M,N), M2(1,1) to M2(M,N) to the programming state (Distribution D1), and then perform a weak erasing procedure to set the memory cells M1(1,1) to M1(M,N), M2(1,1) to M2(M,N) to the metastable state (Distribution Dm). In some embodiments, when setting the metastable state, the controller 14 may first erase the data in the memory cells M1(1,1) to M1(M,N), M2(1,1) to M2(M,N) (Distribution D0), and then perform a weak programming procedure to set the memory cells M1(1,1) to M1(M,N), M2(1,1) to M2(M,N) to the metastable state (Distribution Dm).

When generating a random bit Dpuf, the current comparator 16 may read a first current from one of the memory cells M1(1,1) to M1(M,N), and read a second current from the memory cell M2(1,1) to M2(M,N), and output a random bit Dpuf according to the first current and the second current. Specifically, the current comparator 16 may compare the first current and the second current to generate a comparison result, and generate the random bit Dpuf according to the comparison result. If the comparison result shows that the first current is higher than the second current, the current comparator 16 outputs the first logical value of the random bit Dpuf; and if the comparison result shows that the first current is less than the second current, the current comparator 16 outputs the second logical value of the random bit Dpuf. Since the PUF circuit 1 outputs the random bit Dpuf according to the first current and the second current, the randomness of the random bit Dpuf is not affected by the read current level, thereby enhancing the randomness of the random bit Dpuf. In addition, FIG. 2 shows that the distribution Dm of the metastable state is wider than the distribution D1 of the programming state and the distribution D0 of the erased state. Therefore, the difference between the first current and the second current may be larger, increasing the randomness of the random bit Dpuf and accelerating generation of the random bit Dpuf.

Figure 3:
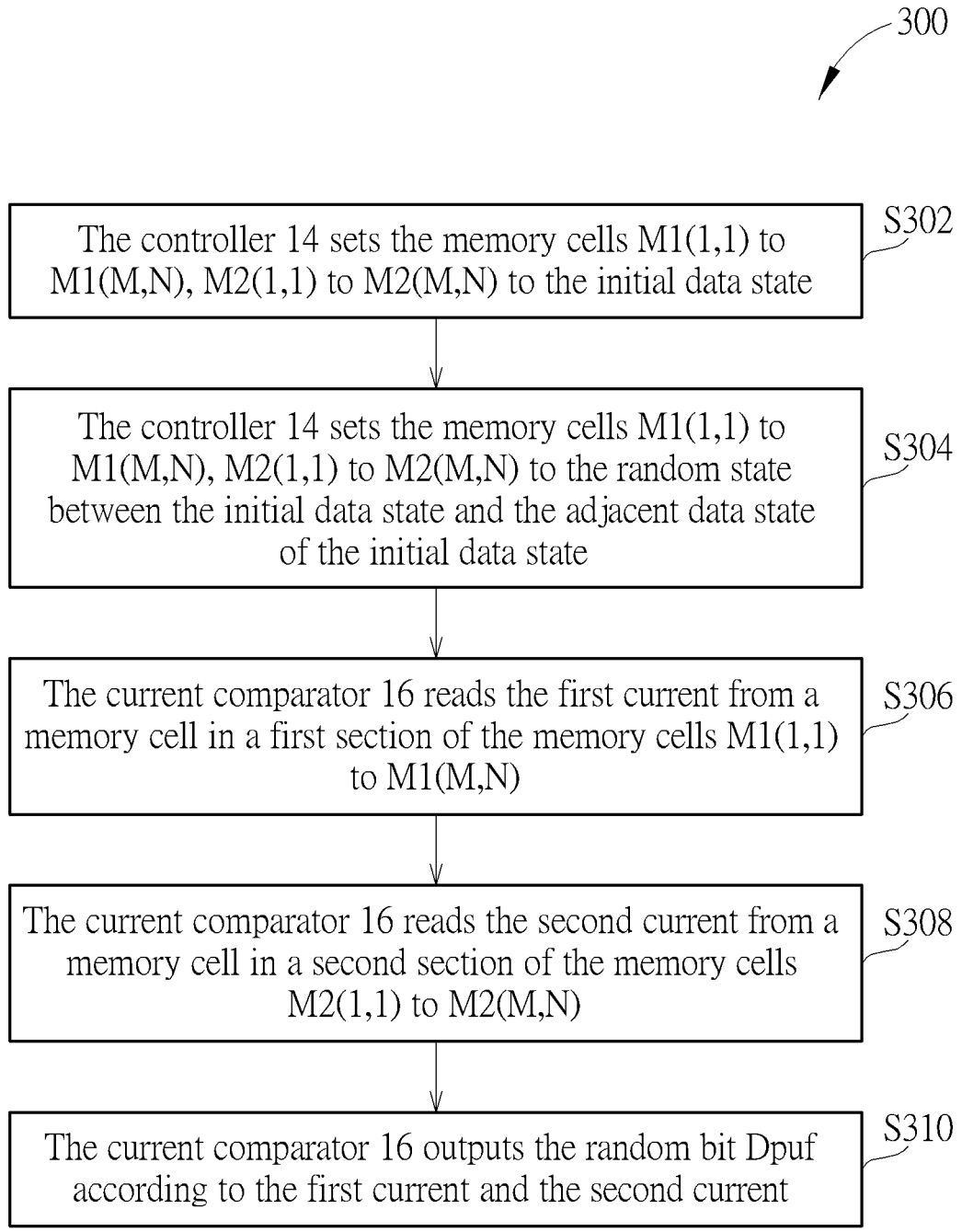
FIG. 3 is a flowchart of a method of operating the PUF circuit in FIG. 1.

FIG. 3 is a flowchart of a method 300 of operating the PUF circuit 1. The method 300 includes Step S302 to S310 to generate the random bit Dpuf. Any reasonable step change or adjustment is within the scope of the disclosure. Steps S302 to S310 are detailed as follows:

Step S302: The controller 14 sets the memory cells M1(1,1) to M1(M,N), M2(1,1) to M2(M,N) to the initial data state;

Step S304: The controller 14 sets the memory cells M1(1,1) to M1(M,N), M2(1,1) to M2(M,N) to the metastable state between the initial data state and the adjacent data state of the initial data state;

Step S306: The current comparator 16 reads the first current from a memory cell in a first section of the memory cells M1(1,1) to M1(M,N);

Step S308: The current comparator 16 reads the second current from a memory cell in a second section of the memory cells M2(1,1) to M2(M,N);

Step S310: The current comparator 16 outputs the random bit Dpuf according to the first current and the second current.

In Step S302, the initial data state may be the programming state or the erased state. In Step S304, if the initial data state is the programming state, the adjacent data state is the erased state, and the controller 14 applies a weak erasing pulse to the memory cells M1(1,1) to M1(M,N), M2(1,1) to M2(M,N) to set the memory cells M1(1,1) to M1(M,N), M2(1,1) to M2(M,N) to the metastable state between the programming state and the erased state. Specifically, the controller 14 may apply the weak erasing pulse to the control terminals of the memory cells M1(1,1) to M1(M, N), M2(1,1) to M2(M,N), and apply a high voltage to the common P-type well of the memory cells M1(1,1) to M1(M,N), M2(1,1) to M2 (M, N). The weak erasing pulse may be 7-8V. If the initial data state is the erased state, the adjacent data state is the programming state, and the controller 14 applies a weak programming pulse to the memory cells M1(1,1) to M1(M,N), M2(1,1) to M2(M,N) to set the memory cells M1(1,1) to M1(M,N), M2(1,1) to M2(M,N) to the metastable state between the erased state and the programming state. Specifically, the controller 14 may apply the weak programming pulses to the control terminals of the memory cells M1(1,1) to M1(M,N), M2(1,1) to M2(M,N) via the word lines WL1(1) to WL1(N), WL2(1) to WL2(N), and apply a positive voltage to the memory cells M1(1,1) to M1(M,N), M2(1,1) to M2(M,N) via the bit lines BL1(1) to BL1(M), BL2(1) to BL2(M). The weak programming pulse may be 7-8V. In Steps S306 and S308, the memory cell in the first section is located in a specific area in the memory block 121, and the memory cell in the second section is located in a specific area in the memory block 122. In some embodiments, the memory cell in the first section is located in an nth row in the memory block 121, and the memory cell in the second section is located in an nth row in the memory block 122. Upon receiving a request for generating a random bit Dpuf, the controller 14 enables the nth row of the memory block 121 and the nth row of the memory block 122 using the word lines WL1(n) and WL2(n), respectively, and the current comparator 16 reads the first current from the memory cell M1(m,n) in the nth row and mth column of the memory block 121, and reads the second current from the memory cell M2(m,n) in the nth row and the mth column of the memory block 122, where n is a positive integer between 1 and N, and m is a positive integer between 1 and M. In some embodiments, the memory cell in the first section is located in the (n1)th row of the memory block 121, and the memory cell in the second section is located in the (n2)th row of the memory block 122, and n1 and n2 are positive Integers between 1 and N. The controller 14 may respectively enable the (n1)th row of the memory block 121 and the (n2)th row of the memory block 122 via the word lines WL1(n1) and WL2(n2), so that the current comparator 16 reads the first current from the memory cell M1(m,n1) in the (n1)th row and mth column of block 121 and reads the second current from the memory cell M2(m,n2) in the (n2)th row and mth column of the memory block 122, m being a positive integer from 1 to M. In Step S310, if the comparison result shows that the first current is higher than the second current, the current comparator 16 outputs the first logical value (logic "0") of the random bit Dpuf; and if the comparison result shows that the first current is less than the second current, the current comparator 16 outputs the second logical value (logic "1") of the random bit Dpuf. In some embodiments, the current comparator 16 may also read a plurality of memory cells from the nth row of the memory block 121 and the nth row of the memory block 122 respectively to generate k first currents and k second currents, respectively, and compare the k first currents and the k corresponding second currents to generate k random bits Dpuf, k being a positive integer between 1 and M. Please refer to Table 1, the current comparator 16 reads the memory cells M1(m,n) coupled to the word line WL1(n) and the memory cells M2(m,n) coupled to the word line WL2(n) to obtain 7 first currents and 7 second currents, respectively, and compares the 7 first currents {8 µA, 7 µA, 12 µA, 4 µA, 15 µA, 9 µA, 9 µA} and the 7 corresponding second currents {4 µA, 12 µA, 14 µA, 5 µA, 12 µA, 3 µA, 15 µA}, respectively, to generate 7-bit random bits Dpuf {0(8>4), 1(7<12), 1(12<14), 1(4<5), 0(15>12), 0(9>3), 1(9<15)}.

TABLE 1

| WL1(n) | WL2(n) | Dpuf |
|---|---|---|
| 8 | 4 | 0 |
| 7 | 12 | 1 |
| 12 | 14 | 1 |
| 4 | 5 | 1 |
| 15 | 12 | 0 |
| 9 | 3 | 0 |
| 9 | 15 | 1 |

The operation method 300 outputs random bits Dpuf according to the first currents and the second currents. Therefore, the randomness of the random bits Dpuf is not affected by the read current level, enhancing the randomness of the random bits Dpuf.

Figure 4:
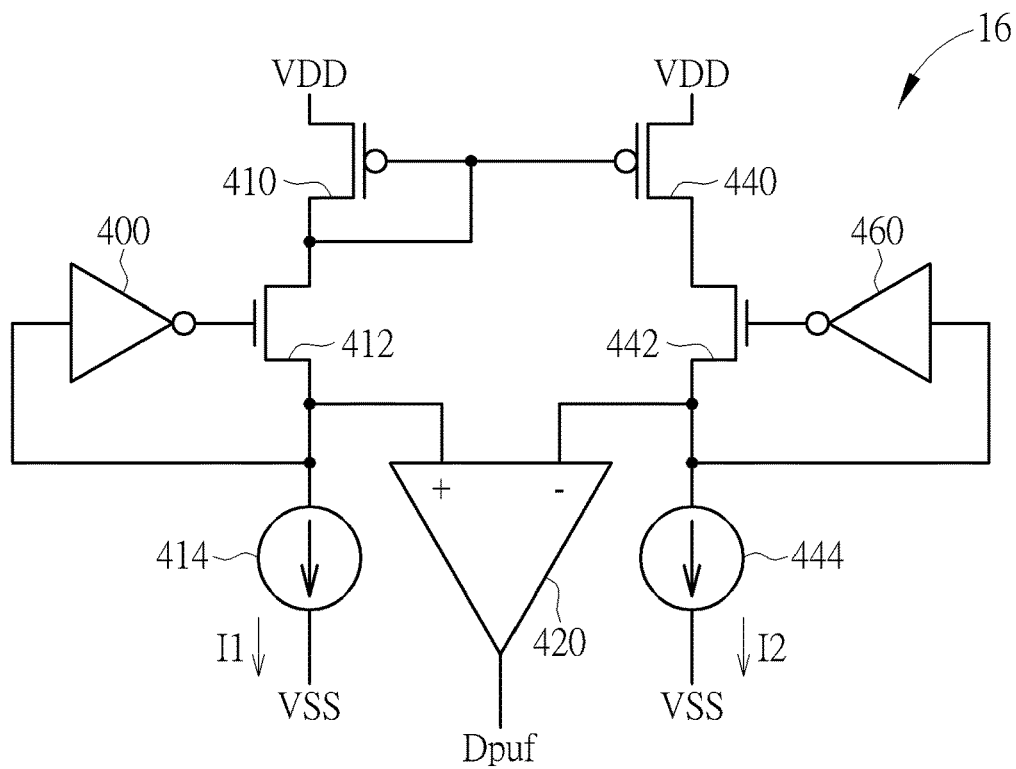
FIG. 4 is a schematic diagram of the current comparator in FIG. 1 according to an embodiment of the invention.

FIG. 4 is a schematic diagram of the current comparator 16 according to an embodiment of the invention. The current comparator 16 includes transistors 410, 412, 440 and 442, inverters 400 and 460, current sources 414 and 444, and an operation amplifier 420. The current comparator 16 may output the random bit Dpuf according to the first current I1 and the second current I2.

The transistor 410 includes a first terminal configured to receive a supply voltage VDD; a second terminal; and a control terminal coupled to the second terminal of the transistor 410. The transistor 412 includes a first terminal coupled to the second terminal of the transistor 410; a second terminal; and a control terminal. The current source 414 includes a first terminal coupled to the second terminal of the transistor 412, and a second terminal configured to receive a ground voltage VSS. The inverter 400 includes a first terminal coupled to the first terminal of the current source 414; and a second terminal coupled to the control terminal of the transistor 412. The transistor 440 includes a first terminal configured to receive the supply voltage VDD; a second terminal; and a control terminal coupled to the control terminal of the transistor 410. The transistor 442 includes a first terminal coupled to the second terminal of the transistor 440; a second terminal; and a control terminal. The current source 444 includes a first terminal coupled to the second terminal of the transistor 442, and a second terminal configured to receive the ground voltage VSS. The inverter 460 includes a first terminal coupled to the first terminal of the current source 444; and a second terminal coupled to the control terminal of the transistor 442. The operation amplifier 420 includes a first input terminal coupled to the second terminal of the transistor 412; a second input terminal coupled to the second terminal of the transistor 442; and an output terminal. The first input terminal of the operation amplifier 420 may be a non-inverting input terminal, and the second input terminal of the operation amplifier 420 may be an inverting input terminal. The transistors 410 and 440 may be P-type transistors, and the transistors 412 and 442 may be N-type transistors.

The transistors 410 and 440 may serve as a current mirror. The transistors 412 and 442 may serve as current clamps. In the initial state, the first current I1 and the second current I2 are 0, and the control terminal of the transistor 412 and the control terminal of the transistor 442 may receive a fixed bias voltage, e.g., 0.8V, to clamp the voltages at the first input terminal and the second input terminal of the operation amplifier 420. When generating the random bit Dpuf, if the first current I1 is higher than the second current I2, the current source 414 increases the voltage at the first terminal of the current source 414 according to the first current I1, the inverter 400 reduces the voltage at the second terminal thereof, and the transistor 412 will reduce the voltage at the first input terminal of the operation amplifier 420. Similarly, the current source 444 increases the voltage at the first terminal of the current source 444 according to the second current I2, and the inverter 460 reduces the voltage at the second terminal thereof, and the transistor 442 will reduce the voltage at the second input terminal of the operation amplifier 420. Since the first current I1 is higher than the second current I2, the voltage at the first input terminal of the operation amplifier 420 will be less than the second input terminal of the operation amplifier 420, and the output terminal of the operation amplifier 420 will output a logic "0" as the random bit Dpuf. If the first current I1 is less than the second current I2, the voltage at the first input terminal of the operation amplifier 420 will be higher than the voltage at the second input terminal, and the output terminal of the operation amplifier 420 will output a logic "1" as the random bit Dpuf.

Figure 5:
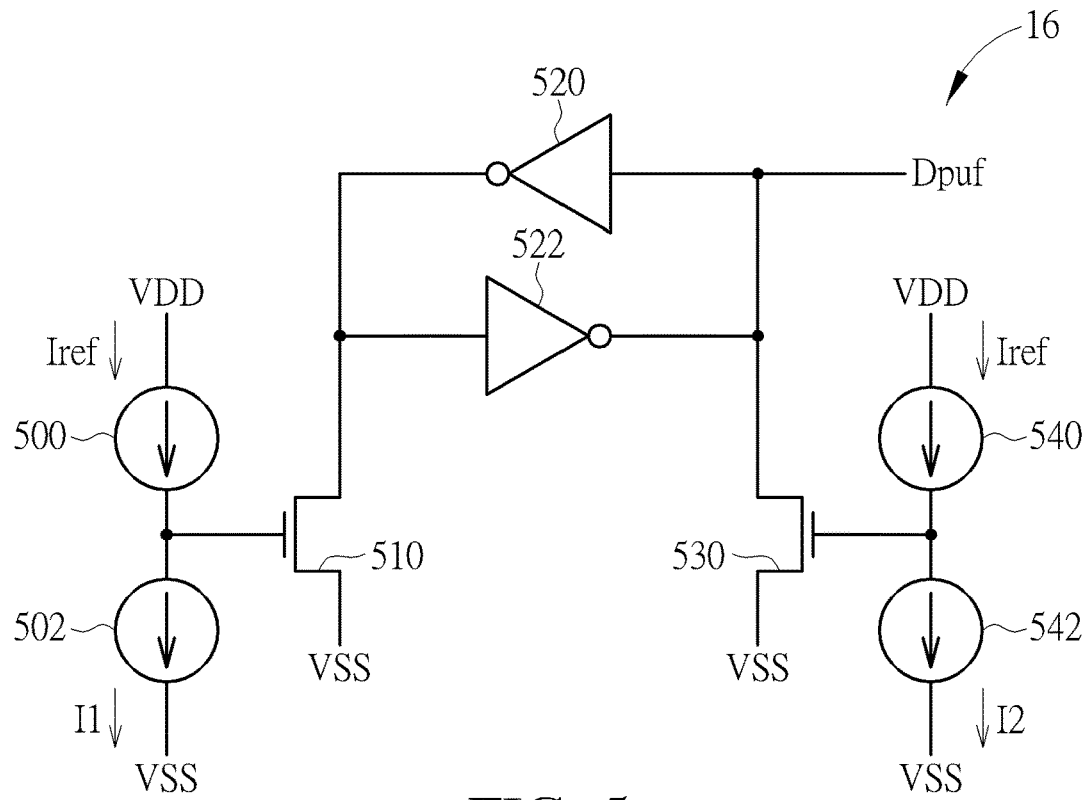
FIG. 5 is a schematic diagram of the current comparator in FIG. 1 according to another embodiment of the invention.

FIG. 5 is a schematic diagram of the current comparator 16 according to another embodiment of the invention. The current comparator 16 includes current sources 500, 502, 540 and 542, transistors 510 and 530, and inverters 520 and 522. The current comparator 16 may output the random bit Dpuf according to the first current I1 and the second current I2.

The current source 500 includes a first terminal configured to receive the supply voltage VDD; and a second terminal. The current source 502 includes a first terminal coupled to the second terminal of the current source 500, and a second terminal configured to receive the ground voltage VSS. The transistor 510 includes a first terminal; a second terminal configured to receive the ground voltage VSS; and a control terminal coupled to the second terminal of the current source 500 and the first terminal of the current source 502. The current source 540 includes a first terminal configured to receive the supply voltage VDD; and a second terminal. The current source 542 includes a first terminal coupled to the second terminal of the current source 540, and a second terminal configured to receive the ground voltage VSS. The transistor 530 includes a first terminal; a second terminal configured to receive the ground voltage VSS; and a control terminal coupled to the second terminal of the current source 540 and the first terminal of the current source 542. The inverter 522 includes a first terminal coupled to the first terminal of the transistor 510; and a second terminal coupled to the first terminal of the transistor 530. The inverter 520 includes a first terminal coupled to the first terminal of the transistor 530; and a second terminal coupled to the first terminal of the transistor 510. The transistors 510 and 530 may be N-type transistors.

The current sources 500 and 540 may generate a reference current Iref. The current source 502 may generate a first current I1, and the current source 542 may generate a second current I2. Inverters 520 and 522 may form a latch. In the initial state, the first current I1 and the second current I2 are 0, and the control terminal of the transistor 510 and the control terminal of the transistor 530 may receive a fixed bias voltage to establish equal voltages at the first terminal of the transistor 510 and the first terminal of the transistor 530. When generating the random bit Dpuf, if the first current I1 is higher than the second current I2, the current sources 500 and 502 will establish a voltage at the control terminal of the transistor 510 according to the difference between the reference current Iref and the first current I1. The current sources 540 and 542 will establish a voltage at the control terminal of the transistor 530 according to the difference between the reference current Iref and the second current I2. If the first current I1 is higher than the second current I2, the voltage at the control terminal of the transistor 510 will be less than the voltage at the control terminal of the transistor 530, the voltage at the first terminal of the transistor 510 will be higher than the voltage at the first terminal of the transistor 530, and the latch will output a logic "0" as the random bit Dpuf. If the first current I1 is less than the second current I2, the voltage at the control terminal of the transistor 510 will be higher than the voltage at the control terminal of the transistor 530, the voltage at the first terminal of the transistor 510 will be less than the voltage at the first terminal of the transistor 530, and the latch will output a logic "1" as the random bit Dpuf.

Figure 6:
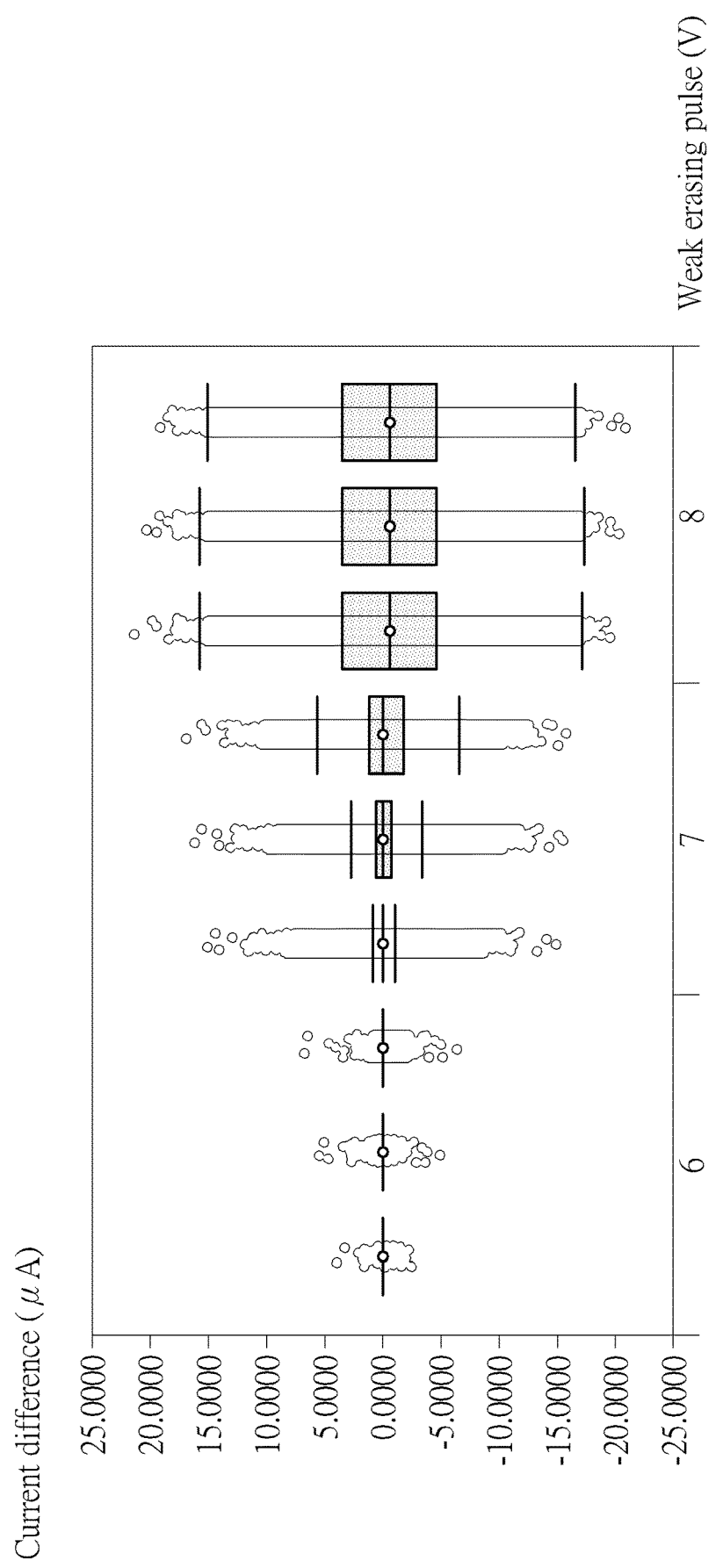
FIG. 6 shows a relationship between the weak erasing pulse and the current difference between the first current and the second current.

FIG. 6 shows a relationship between the weak erasing pulse and the current difference between the first current and the second current, where the horizontal axis represents the weak erasing pulse, and the vertical axis represents the current difference between the first current I1 and the second current I2. When the weak erasing pulse is between 6V and 8V, the current difference between the first current I1 and the second current I2 has a normal distribution centered at 0. When the weak erasing pulse is increased from 6V to 8V, the current difference between the first current I1 and the second current I2 also expands from ±5 µA to ±20 µA. When the weak erasing pulse is less than 7V, the current difference between the first current I1 and the second current I2 will exceed ±10 µA. Therefore, the PUF circuit 1 may use the weak erasing pulses ranging from 7V to 8V to set the memory cells M1(1,1) to M1(M,N), M2(1,1) to M2(M,N) to the metastable state.

Figure 7:
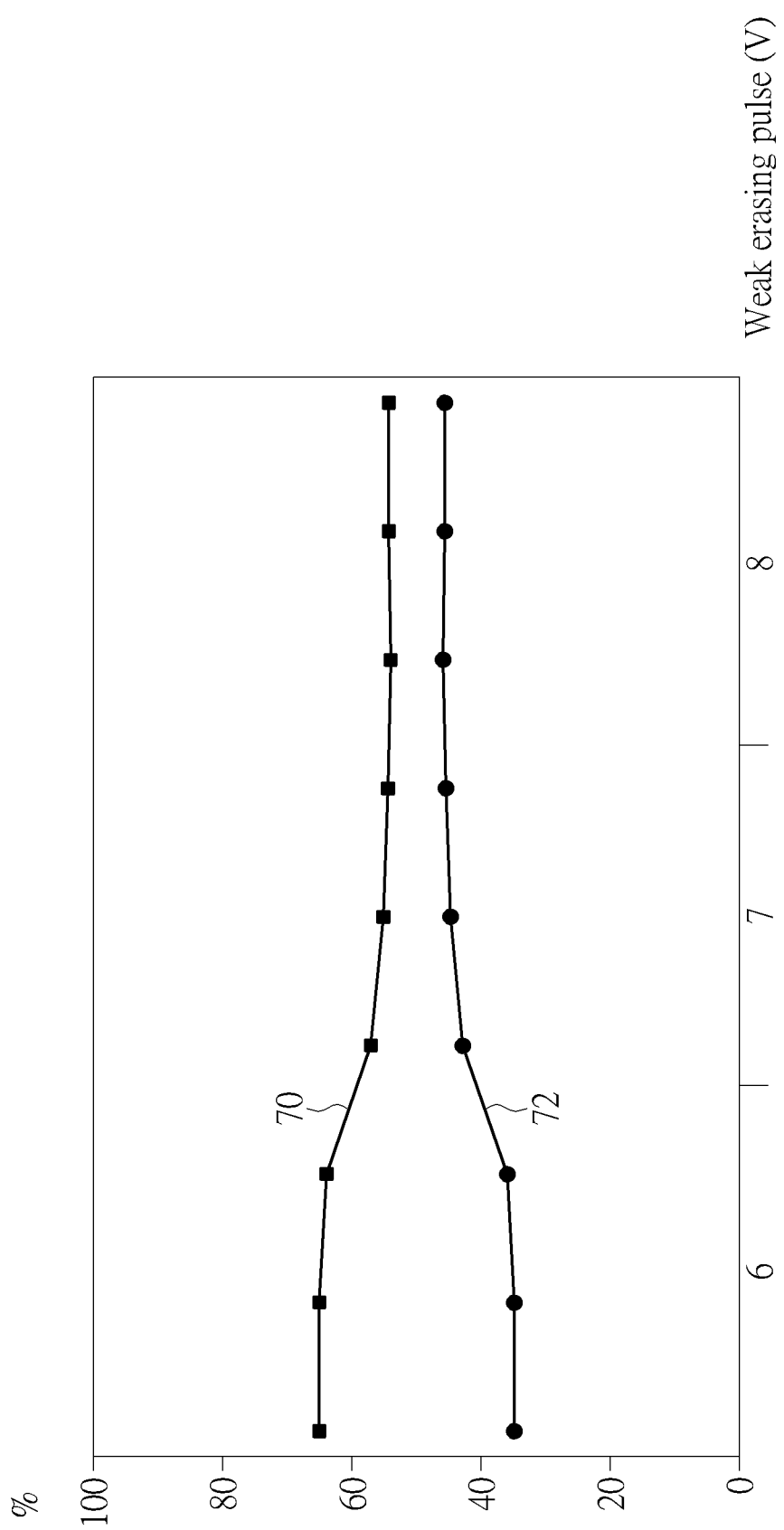
FIG. 7 shows the relationship between weak erasing pulse and the random bit.

FIG. 7 shows the relationship between weak erasing pulse and the random bit, where the horizontal axis represents the weak erasing pulse, and the vertical axis represents the percentage. The curve 70 represents that the random bit Dpuf is the first logical value; the curve 72 represents that the random bit Dpuf is the second logical value. When the weak erasing pulse increases from 6V to 8V, the curves 70 and 72 gradually approach 50%. When the weak erasing pulse is between 7V and 8V, the percentage of the random bit Dpuf being the first logical value and the percentage of the random bit Dpuf being the second logical value are approximately 50% each. Therefore, the PUF circuit 1 may use weak erasing pulses ranging from 7V to 8V to set the memory cells M1(1,1) to M1(M,N), M2(1,1) to M2(M,N) to the metastable state, thereby enhancing randomness.

Figure 8:
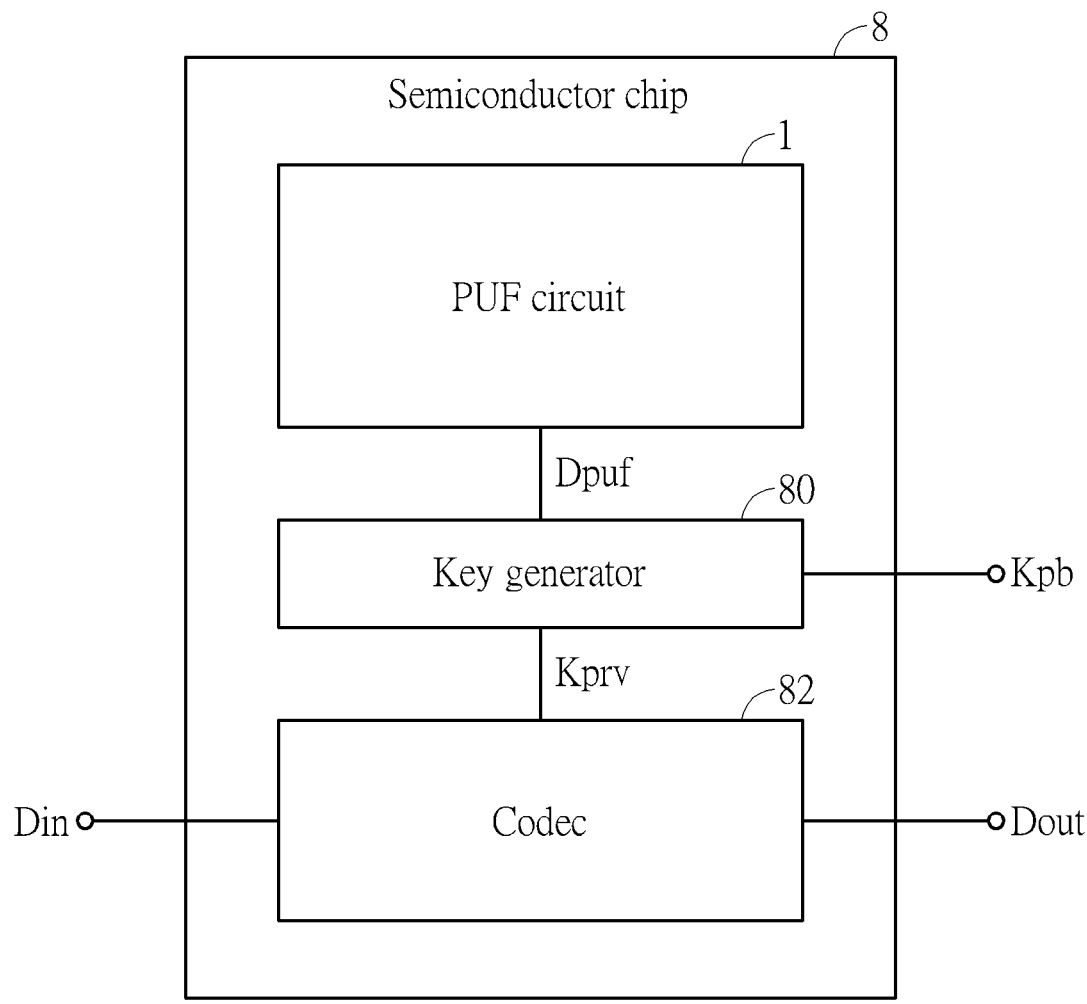
FIG. 8 is a block diagram of a semiconductor chip according to an embodiment of the invention.

FIG. 8 is a block diagram of a semiconductor chip 8 according to an embodiment of the invention. The semiconductor chip 8 includes a PUF circuit 1, a key generator 80 and a codec 82. The PUF circuit 1, the key generator 80 and the codec 82 are sequentially coupled. The configurations and the operations of the PUF circuit 1 have been explained in the preceding paragraphs, and will not be repeated here.

When performing encoding/decoding, the PUF circuit 1 may receive a request for generating a random bit Dpuf, the key generator 80 may generate a public key Kpb and a private key Kprv according to the random bit Dpuf, and the codec 82 may encode or decode the input data Din according to the private key Kprv to generate the output data Dout. The input data Din may be data without encoding, address without encoding, encoded data, and/or encoded address. After encoding, the codec 82 may output the output data Dout to an external circuit, the key generator 80 may output the public key Kpb to the external circuit, and the external circuit may decode the output data Dout according to the public key Kpb to obtain input data Din. Since the random bit Dpuf has the enhanced randomness, the data security of the input data Din may be ensured.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method of operating a physically unclonable function (PUF) circuit, the physical unclonable function circuit comprising a flash memory, a current comparator and a controller, the flash memory comprising a plurality of memory cells, the method comprising:
   the controller setting the plurality of memory cells to an initial data state;

the controller setting the plurality of memory cells to a state between the initial data state and an adjacent data state of the initial data state;

the current comparator reading a first current from a memory cell in a first section of the plurality of memory cells;

the current comparator reading a second current from a memory cell in a second section of the plurality of memory cells; and the current comparator outputting a random bit according to the first current and the second current.

2. The method of claim 1, wherein the current comparator generating the random bit according to the first current and the second current comprises: if the first current is higher than the second current, the current comparator outputting a first logical value of the random bit.

3. The method of claim 1, wherein the current comparator generating the random bit according to the first current and the second current comprises: if the first current is less than the second current, the current comparator outputting a second logical value of the random bit.

4. The method of claim 1, wherein the initial data state is a programming state, the adjacent data state is an erased state, and the controller setting the plurality of memory cells to the state between the initial data state and the adjacent data state of the initial data state comprises: the controller applying a weak erasing pulse to the plurality of memory cells to set the memory cells to the state between the initial data state and the adjacent data state.

5. The method of claim 1, wherein the initial data state is an erased state, the adjacent data state is a programming state, and the controller setting the plurality of memory cells to the state between the initial data state and the adjacent data state of the initial data state comprises: the controller applies a weak program pulse to the memory cells to set the plurality of memory cells to the state between the initial data state and the adjacent data state.

6. The method of claim 1, wherein the current comparator is a sense amplifier.

7. The method of claim 1, wherein the current comparator is a differential current comparator.

8. A physical unclonable function circuit comprising:

a flash memory comprising a plurality of memory cells;

a current comparator coupled to a memory cell in a first section of the plurality of memory cells and a memory cell in a second section of the plurality of memory cells; and a controller coupled to the flash memory and the current comparator;

wherein the controller is configured to set the plurality of memory cells to an initial data state, and set the plurality of memory cells to a state between the initial data state and an adjacent data state of the initial data state; and the current comparator is configured to read the first current from the memory cell in the first section, read the second current from the memory cell in the second section, and output a random bit according to the first current and the second current.

9. The physical unclonable function circuit of claim 8, wherein if the first current is higher than the second current, the current comparator is configured to output a first logical value of the random bit.

10. The physical unclonable function circuit of claim 8, wherein if the first current is less than the second current, the current comparator is configured to output a second logical value of the random bit.

11. The physical unclonable function circuit of claim 8, wherein the initial data state is a programming state, the adjacent data state is an erased state, and the controller is configured to apply a weak erasing pulse to set the plurality of memory cells to the state between the initial data state and the adjacent data state.

12. The physical unclonable function circuit of claim 8, wherein the initial data state is an erased state, the adjacent data state is a programming state, and the controller is configured to apply a weak program pulse to set the plurality of memory cells to the state between the initial data state and the adjacent data state.

13. The physical unclonable function circuit of claim 8, wherein the current comparator is a sense amplifier.

14. The physical unclonable function circuit of claim 8, wherein the current comparator is a differential current comparator.

15. A semiconductor chip comprising:

a physical unclonable function circuit comprising:
  a flash memory comprising a plurality of memory cells;
  a current comparator coupled to a memory cell in a first section of the plurality of memory cells and a memory cell in a second section of the plurality of memory cells; and
  a controller coupled to the flash memory and the current comparator; and a key generator coupled to the physical unclonable function circuit;

wherein the controller is configured to set the plurality of memory cells to an initial data state, and set the plurality of memory cells to a state between the initial data state and an adjacent data state of the initial data state;

the current comparator is configured to read the first current from the memory cell in the first section, read the second current from the memory cell in the second section, and output a random bit according to the first current and the second current; and the key generator is configured to generate a key according to the random bit.

16. The semiconductor chip of claim 15, wherein if the first current is higher than the second current, the current comparator is configured to output a first logical value of the random bit.

17. The semiconductor chip of claim 15, wherein if the first current is less than the second current, the current comparator is configured to output a second logical value of the random bit.

18. The semiconductor chip of claim 15, wherein the initial data state is a programming state, the adjacent data state is an erased state, and the controller is configured to apply a weak erasing pulse to set the plurality of memory cells to the state between the initial data state and the adjacent data state.

19. The semiconductor chip of claim 15, wherein the initial data state is an erased state, the adjacent data state is a programming state, and the controller is configured to apply a weak program pulse to set the plurality of memory cells to the state between the initial data state and the adjacent data state.

20. The semiconductor chip of claim 15, wherein the current comparator is a sense amplifier or a differential current comparator.

* * * * *